(12) United States Patent
Imaguchi

(10) Patent No.: US 11,259,470 B2
(45) Date of Patent: Mar. 1, 2022

(54) SEEDLING TRANSPLANTER

(71) Applicant: IMA CO., LTD., Osaka (JP)

(72) Inventor: Masakazu Imaguchi, Osaka (JP)

(73) Assignee: IMA CO., LTD., Kishiwada (JP)

( * ) Notice: Subject to any disclaimer, the term of this patent is extended or adjusted under 35 U.S.C. 154(b) by 0 days.

(21) Appl. No.: 17/058,501

(22) PCT Filed: May 16, 2019

(86) PCT No.: PCT/JP2019/019424
§ 371 (c)(1),
(2) Date: Nov. 24, 2020

(87) PCT Pub. No.: WO2019/230408
PCT Pub. Date: Dec. 5, 2019

(65) Prior Publication Data
US 2021/0195849 A1 Jul. 1, 2021

(30) Foreign Application Priority Data
May 28, 2018 (JP) .............................. JP2018-101431

(51) Int. Cl.
*A01G 9/08* (2006.01)
*A01G 31/04* (2006.01)

(52) U.S. Cl.
CPC .............. *A01G 9/08* (2013.01); *A01G 31/04* (2013.01)

(58) Field of Classification Search
CPC ........ A01G 31/042; A01G 31/04; A01G 9/08; A01G 9/081; A01G 9/083; A01G 9/085; A01G 9/086; A01G 9/088
See application file for complete search history.

(56) References Cited

U.S. PATENT DOCUMENTS

| 5,680,727 A | 10/1997 | Sakaue et al. | |
| 6,327,986 B1 * | 12/2001 | Williames | A01C 11/025 |
| | | | 111/105 |
| 7,905,186 B2 * | 3/2011 | Faulring | A01G 9/0299 |
| | | | 111/105 |

(Continued)

FOREIGN PATENT DOCUMENTS

| CN | 108366536 A | 8/2018 |
| CN | 110149971 A * | 8/2019 |

(Continued)

OTHER PUBLICATIONS

International Search Report (PCT/ISA/210) dated Jun. 18, 2019, in corresponding International Patent Application No. PCT/JP2019/019424.

(Continued)

*Primary Examiner* — Monica L Barlow
*Assistant Examiner* — Aaron M Rodziwicz

(57) ABSTRACT

In order to reduce a possibility of damaging a seedling in the event of transplant of unit nursery beds when the seedlings are replanted from a seedling tray that supports unit nursery beds individually planted with seedlings germinated from seeds to a hydroponic panel capable of securing a longer seedling-to-seedling distance, a seedling transplanter (1) includes: a seedling tray (3) supported by a frame (2) and configured to support a nursery bed (7) having unit nursery beds (71) separable from each other and arranged in two directions on a plane; a hydroponic panel (4) supported by the frame (2) and provided with holes (41) for storing the unit nursery beds (71), the hydroponic panel (4) serving as a transplant destination of the unit nursery beds (71) on the seedling tray (3); and a holding member (5) supported by the frame (2) pivotally around a vertical axis and vertically movably to separate the unit nursery bed (71) from the nursery bed (7) by holding any one or a plurality of the unit nursery beds (71) on the seedling tray (3) arranged in the outermost side of the nursery bed (7) from a lateral face side (Continued)

of the unit nursery bed (71) in a width direction of the unit nursery bed (71), insert the unit nursery bed (71) into the hole (41) of the hydroponic panel (4), and release the unit nursery bed (71).

5 Claims, 10 Drawing Sheets

(56) References Cited

U.S. PATENT DOCUMENTS

| | | | | |
|---|---|---|---|---|
| 7,954,439 | B2* | 6/2011 | Faulring | A01G 9/0299 |
| | | | | 111/105 |
| 8,122,838 | B2* | 2/2012 | Faulring | A01G 9/0299 |
| | | | | 111/105 |
| 10,225,993 | B2* | 3/2019 | Alexander | A01G 9/02 |
| 10,716,265 | B2* | 7/2020 | Alexander | B25J 5/02 |
| 2002/0043195 | A1* | 4/2002 | Williames | A01C 11/025 |
| | | | | 111/105 |
| 2017/0094896 | A1 | 4/2017 | Van Der Knaap et al. | |

FOREIGN PATENT DOCUMENTS

| | | |
|---|---|---|
| EP | 0 672 343 A1 | 9/1994 |
| EP | 3 395 162 A1 | 10/2018 |
| JP | 4-66015 A | 3/1992 |
| JP | 7-99850 A | 4/1995 |
| JP | 11-103703 A | 4/1999 |
| JP | 2000-32850 A | 2/2000 |
| JP | 2004-187661 A | 7/2004 |
| JP | 2004-242652 A | 9/2004 |
| JP | 2016-7199 A | 1/2016 |
| JP | 2017-85988 A | 5/2017 |
| JP | 2018-68180 A | 5/2018 |
| KR | 95-703847 A | 11/1995 |
| WO | WO 2017/110371 A1 | 6/2017 |

OTHER PUBLICATIONS

Written Opinion of the International Searching Authority (PCT/ISA/237) dated Jun. 18, 2019, in corresponding International Patent Application No. PCT/JP2019/019424.

International Preliminary Report on Patentability (PCT/IPEA/408) dated Jan. 14, 2020, in corresponding International Patent Application No. PCT/JP2019/019424.

International Preliminary Report on Patentability (PCT/IPEA/409) dated May 12, 2020, in corresponding International Patent Application No. PCT/JP2019/019424.

* cited by examiner

SEEDLING TRANSPLANTER

CROSS REFERENCE TO RELATED APPLICATIONS

This application is a U.S. National Stage Application which claims the benefit under 35 U.S.C. § 371 of International Patent Application No. PCT/JP2019/19424 filed on May 16, 2019, which claims foreign priority benefit under 35 U.S.C. § 119 of Japanese Patent Application No. 2018-101431 filed on May 28, 2018 in the Japanese Patent Office, the contents of both of which are incorporated herein by reference.

FIELD OF THE INVENTION

The present invention relates to a seedling transplanter used to replant (transplant) seedlings from a seedling tray that supports unit nursery beds in which seedlings or nursery trees of vegetables, fruit, or others germinated from seeds are individually planted to a hydroponic panel capable of securing a larger seedling-to-seedling distance.

BACKGROUND OF THE INVENTION

In a nursery bed where plants are planted in a seed state and germinated seedings are planted, the seedlings are divided into seedling units and are planted for each unit nursery bed partitioned (arranged) in two horizontal directions. For this reason, when the seedings are replanted from a seedling tray that supports the nursery bed to a hydroponic panel capable of securing a large distance between adjacent seedlings, the plants are moved (transplanted) to the hydroponic panel arranged in a separate position while being held in each unit nursery bed (see Patent Documents 1 to 4).

In the nursery bed, the unit nursery beds are arranged while making contact with each other in two directions. Therefore, a plant is moved (transplanted) to the hydroponic panel for each unit nursery bed by holding (gripping) a seedling protruding from the nursery bed (Patent Documents 1 and 2) or by holding the unit nursery bed with a holding (gripping) tool (Patent Documents 3 and 4). Here, if a seedling that has just germinated from the unit nursery bed is directly held, the seedling is highly likely damaged. Therefore, it is considered that the method of holding the unit nursery bed (Patent Documents 3 and 4) is appropriate in order to avoid any damage to the seedling.

CITATION LIST

Patent Documents

Patent Document 1: JP-A-11-103703 (Paragraphs [0015] to [0030] and FIGS. 11 to 17)
Patent Document 2: JP-A-2004-242652 (Paragraphs [0011] to [0014] and FIGS. 1 and 5 to 9)
Patent Document 3: JP-A-2016-7199 (Paragraphs [0012] to [0028] and FIGS. 4 and 10 to 13)
Patent Document 4: JP-A-2017-85988 (Paragraphs [0019] to [0051] and FIGS. 1 and 7 to 22)

SUMMARY OF THE INVENTION

In the method of holding the unit nursery bed (Patent Documents 3 and 4), the unit nursery bed is moved to a cultivation pallet (hydroponic panel) or the like having a size larger than a plant container (seedling tray) and arranged under the plant container or the like that supports the nursery bed having a plurality of unit nursery beds (see Patent Document 3, paragraph [0034] and Patent Document 4, paragraph [0046]). Therefore, the unit nursery bed passes through a hole formed in the plant container or the like. When the unit nursery bed passes through the hole of the plant container or the like, the unit nursery bed is compressed toward the center side from the outer peripheral side. Since the seedling also passes through the hole, there is a possibility that the seedling may be damaged when the seedling is grown to be larger than a flat area of the unit nursery bed.

In the techniques of Patent Documents 3 and 4, it is necessary to hold (grip) the unit nursery bed with a pair of openable/closable claws by inserting a holding tool from the bottom of the plant container or the like through a hole of the plant container or the like in order to allow the hole to pass through the unit nursery bed. A pair of claws inevitably draw down the unit nursery bed with a force enough to allow the unit nursery bed to completely pass through the hole while holding the unit nursery bed. Here, in order to extract the unit nursery bed from the hole while holding the unit nursery bed, it is necessary to grip the unit nursery bed with a force by which the unit nursery bed is not released from a pair of claws. This gripping state of the unit nursery bed using a pair of claws may damage roots of the seedling planted in the unit nursery bed.

In view of the aforementioned background, the present invention proposes a seedling transplanter having a low possibility of damage to the seedling in transplant of the unit nursery bed.

According to claim 1 of the invention, there is provided a seedling transplanter including: a seedling tray supported by a frame and configured to support a nursery bed having unit nursery beds individually planted with seedings, separable from each other, and arranged in two directions on a plane; a hydroponic panel supported by the frame and provided with holes for storing the unit nursery beds, the hydroponic panel serving as a transplant destination of the unit nursery beds on the seedling tray; and a holding member supported by the frame pivotally around a vertical axis and vertically movably while allowing advancing to the seeding tray and receding from the seeding tray to separate the unit nursery bed on the seedling tray from the nursery bed, hold the unit nursery bed, insert the held unit nursery bed into the hole of the hydroponic panel, and release the unit nursery bed, wherein the holding member holds any one or a plurality of unit nursery beds 71 arranged in the outermost side of the nursery bed and provided with an opened lateral face not adjacent to the unit nursery bed from both sides of the width direction of the opened lateral face of the unit nursery bed facing the holding member and separates the unit nursery bed from the nursery bed to insert the unit nursery bed into the inside of the hole by directly lowering the unit nursery bed on the hole of the hydroponic panel, the holding member has a main body supported by an arm pivotally supported by the frame around the vertical axis and a pair of gripping claws having tips openably/closably supported by the main body, the pair of gripping claws are inserted in an open state between the adjacent unit nursery beds in both sides of the width direction of the unit nursery bed from the opened lateral face side of the unit nursery bed and are directly closed to interpose and hold the unit nursery bed in the width direction when the holding member advances toward the seeding tray side, and the pair of gripping claws release the unit nursery bed by separating the held unit nursery bed from the nursery bed when the holding member recedes from the seeding tray.

According to claim 2, in the seedling transplanter of claim 1, the holding member approaches the unit nursery bed from a front face side facing the holding member and holds the unit nursery bed from both sides of a direction perpendicular to the front face.

As illustrated in FIGS. 8, 9A, and 9B, the unit nursery beds 71 are arranged adjacently to each other in two directions on a plane to form a nursery bed 7. The phrase "on a plane" means "as seen in a plan view". In claim 1, the phrase "separable from each other" means a case where the unit nursery beds 71 adjacent in two directions are perfectly separated, and a case where the unit nursery beds 71 are tentatively connected in a state that a break can be inserted between the adjacent unit nursery beds 71 and can be separated when they are held by the holding members 5. In the latter case, the connected state is disconnected when the target unit nursery beds 71 to be held by the holding member 5 are interposed and compressed in the width direction, and they are held. The word "target" means "to be held".

The nursery bed 7 is disposed on the seedling tray 3 having a container shape for supplying water to the seedlings of each unit nursery bed 71 as illustrated in FIG. 2 before it is held by the holding member 5. The seedling tray 3 also has a function of placing the remaining unit nursery beds 71 other than one or a plurality of unit nursery beds 71 as a target transplant unit to be held by the holding members 5 at one time in their original positions when the unit nursery bed 71 is moved to the hydroponic panel 4 of the transplant destination.

The frames 2 that support the seedling tray 3 and the hydroponic panel 4 and also support a transplanter 1 are disposed in different positions. One or a plurality of unit nursery beds 71 on the seedling tray 3 are moved to the hydroponic panel 4 by a rotational motion around a vertical axis while being held by the holding members 5 supported by the arm 8 or the like supported by the frame 2 pivotally around a vertical axis. A single unit nursery bed 71 is held by a single holding member 5, and a plurality of unit nursery beds 71 are held by a plurality of holding members 5.

When the holding member 5 holds the unit nursery bed 71 on the seedling tray 3, the held unit nursery bed 71 is separated from other (remaining) unit nursery beds 71 (or the nursery bed 7). Specifically, the holding (gripping) of the unit nursery bed 71 using the holding member 5 is performed by an operation of closing a pair of gripping claws 52 openably/closably supported by the main body 51 supported by the arm 8 from the state of FIG. 6A to the state of FIG. 6B (claim 1).

The holding member 5 is rotated (pivoted) in any direction around a vertical axis while holding the unit nursery bed 71 held on the seedling tray 3. In addition, the holding member 5 is lowered in a vertical direction (along the vertical axis) to insert the unit nursery bed 71 held over the hydroponic panel 4 into the hole 41 formed in the hydroponic panel 4 and release the held unit nursery bed 71. The separation (releasing) of the unit nursery bed 71 using the holding member 5 is performed by an operation of opening the pair of gripping claws 52 from the state of FIG. 6B to the state of FIG. 6A (claim 1). The lowering of the holding member 5 and the lifting thereafter are operated, for example, by expanding or contracting the rod 9 as a vertical shaft pivotally supported by the arm 8 or by lifting or lowering the rod 9 with respect to the arm 8.

The movement (forward movement) of the holding member 5 from the state before holding the unit nursery bed 71 toward the target unit nursery bed 71 on the seedling tray 3 and the holding of the target unit nursery bed 71 using the holding member 5 are operated in response to a command from a controller embedded in the arm 8 or the like or connected to the arm 8 or the like. In addition, the movement of the holding member 5 to the hydroponic panel 4 while holding the unit nursery bed 71 (including the backward movement, rotation, and lowering), the releasing of the unit nursery bed 71 on the hydroponic panel 4, and recovering to the seedling tray 3 (rotation and lifting) are also operated in response to a command from the controller.

After the unit nursery bed 71 held by the holding member 5 is inserted into the hole 41 of the hydroponic panel 4, the holding member 5 is lifted to a height (level) of the seedling tray 3. In addition, the holding member 5 is rotated (pivoted) around a vertical axis, for example, reversely to the rotation of the lowering and is recovered to the position of holding the unit nursery bed 71 on the seedling tray 3. Subsequently, the holding member 5 advances to a posture for allowing the pair of gripping claws 52 to hold the unit nursery bed 71 in the width direction toward the unit nursery bed 71 to be held in the next time.

In claim 1, the "unit nursery beds arranged in the outermost side of the nursery bed and provided with a lateral face not adjacent to the unit nursery bed on the seedling tray" refers to a unit nursery bed 71 arranged (positioned) in the outermost side as any one side of the nursery bed 7 having the unit nursery beds 71 arranged in two directions and provided with a lateral face not adjacent to the unit nursery bed 71. The "lateral face not adjacent to the unit nursery bed" may also be referred to as an "opened lateral face". The "lateral face" is a face directed in the horizontal direction or a face that serves as a vertical surface.

For example, assuming that four unit nursery beds 71 arranged in the longitudinal direction of the nursery bed 7 (the longitudinal direction of the frame 2 (long side direction)) are arranged as a set, and four sets (four lines) are also arranged in the transverse direction of the nursery bed 7 (the width direction of the frame 2 (short side direction)), the four unit nursery beds 71 positioned in any one of both transverse sides of the nursery bed 7 correspond to the "unit nursery bed arranged in the outermost side of the nursery bed and provided with a lateral face not adjacent to the unit nursery bed". Alternatively, the four unit nursery beds 71 positioned in any one of both longitudinal sides of the nursery bed 7 correspond to the "unit nursery bed arranged in the outermost side of the nursery bed and provided with a lateral face not adjacent to the unit nursery bed". The phrase "any one or a plurality of unit nursery beds" means any one or a plurality of unit nursery beds 71 of the line positioned in the outermost side of the nursery bed 7. The word "plurality" means all of the unit nursery beds 7 of a single line.

In claim 1, the phrase "(holds) . . . from the lateral face side of the unit nursery bed" means the holding member 5 starts (approaches) a movement (rectilinear motion) for an operation of the holding member 5 for holding (gripping) the unit nursery bed 71 from the lateral face side arranged in the outermost side of the nursery bed 7 and not adjacent to the unit nursery bed 71 as indicated by the arrow of FIG. 7. The movement direction of the holding member 5 in this case is, for example, the longitudinal direction (long side direction) of the frame 2.

The phrase "holding the unit nursery bed 71 in the width direction of the unit nursery bed 71" means that the holding member 5 holds the unit nursery bed 71 from both sides of the width direction of the front face (in the crossing direction such as a direction perpendicular to the front face) as the "lateral face not adjacent to the unit nursery bed 71" is viewed in the front face (is regarded as the front face). Since the "lateral face of the unit nursery bed 71 not adjacent to the unit nursery bed 71" may be referred to as the "front face of the unit nursery bed 71" in the following description because this lateral face is a face where the holding member 5 and the unit nursery bed 71 face each other when the holding member 5 tries to hold the unit nursery bed 71. The holding member 5 approaches the unit nursery bed 71 while facing the unit nursery bed 71 to be held as illustrated in FIG. 7 before holding the unit nursery bed 71 as illustrated in FIG. 9.

In the case where the unit nursery bed 71 is held by closing a pair of gripping claws 52 (claim 1), the holding member 5 approaches the target unit nursery bed 71 by making a rectilinear motion (forward movement) from the lateral face (front face) side not adjacent to the unit nursery bed 71 as illustrated in FIGS. 7 and 8, and a pair of opened gripping claws 52 (spaced apart) are inserted between the adjacent unit nursery beds 71. In this state, the unit nursery bed 71 to be held is held (gripped) in the width direction by closing (approach each other) a pair of gripping claws 52 as illustrated in FIGS. 9A and 9B. In the following description, the "width direction of the unit nursery bed 71" refers to a direction of the unit nursery bed 71 facing a face of the unit nursery bed 71 perpendicular to the lateral face not adjacent to the unit nursery bed 71 by assuming that the unit nursery bed 71 is, for example, a rectangular solid. However, the shape of the unit nursery bed 71 is not limited to the rectangular solid, but may have any shape such as a polygonal prismatic shape or a circular cylindrical shape.

In the drawings, while the unit nursery bed 71 is formed in a rectangular solid shape for arrangement efficiency of the unit nursery beds 71 arranged in two directions on the seedling tray 3, the hole 41 of the hydroponic panel 4 as a transplant destination of the unit nursery bed 71 is formed in a circular (circular cylindrical) shape. However, the hole 41 may also have any planar shape. Although the shape of the unit nursery bed 71 inserted into the hole 41 is illustrated as a circular cylindrical shape by matching the shape of the hole 41 in FIGS. 2 to 5, the shape of the unit nursery bed 71 may maintain the rectangular solid shape even after being inserted into the hole 41 as illustrated in FIG. 1.

Since the holding member 5 holds the unit nursery bed 71 from the lateral face (front face) side not adjacent to the unit nursery bed 71, the unit nursery bed 71 does not pass through the hole of the seedling tray 3 penetrating the seedling tray 3 unlike the case where the unit nursery bed 71 is held from the bottom face side of the seedling tray 3. As a result, it is possible to remove or remarkably reduce a possibility of damaging the seedling planted in the unit nursery bed 71 due to passing through the hole.

Since the holding member 5 holds the unit nursery bed 71 from both sides of the width direction, it is not necessary to apply a force (compression force) for attracting the unit nursery bed 71 from the lower side of the hole to the unit nursery bed 71 unlike the case where the unit nursery bed 71 is held from the bottom face side (Patent Documents 3 and 4). Therefore, it is possible to remove a necessity of maintaining the force for holding the unit nursery bed 71 using the holding member 5. Since the holding force of the holding member 5 can be reduced, it is possible to reduce a possibility of damaging roots of the seedling inside the unit nursery bed 71 caused by applying the compression force to the unit nursery bed 71.

When the holding members 5 hold the target unit nursery beds 71 to be held at one time, it is anticipated that the remaining unit nursery beds 71 not held may not be easily separated from the held unit nursery bed 71. Such a situation is avoided by providing the transplanter 1 having a restraining member 6 configured to press a part of the unit nursery beds 71 (the remaining unit nursery beds 71), on the seedling tray 3, other than the unit nursery bed 71 separated by the holding member 5 from the nursery bed 7 in the lateral face (front face) side of the unit nursery bed 71 to restrain the unit nursery beds 71 in their original positions at the time of separation of the unit nursery bed 71 using the holding member 5 as illustrated in FIGS. 2, 4, and 5 (claim 3).

Since the restraining member 6 restrains the remaining unit nursery beds 71, it is possible to reliably separate the held unit nursery bed 71 from the remaining unit nursery beds 71 not held. The phrase "from the lateral face side of the unit nursery bed" refers to a lateral face (front face) side facing at the start of the movement (rectilinear motion) for an operation for holding the unit nursery bed 71 as described above in a case where the holding member 5 holds the target unit nursery bed 71 to be held as illustrated in FIG. 7.

The restraining member 6 restrains the remaining unit nursery beds 71 in their original positions from the lateral face side where the holding member 5 holds the unit nursery bed 71. Therefore, when the holding member 5 separates the unit nursery bed 71 to be held from the other unit nursery beds 71, the unit nursery bed 71 held by the holding member 5 may be extracted oppositely to the direction where the restraining member 6 presses the other unit nursery beds 71 (oppositely to the direction of moving the holding member 5 for the holding (FIG. 7)). In this case, the direction of extracting the unit nursery bed 71 and the direction of pressedly inserting the remaining unit nursery beds 71 using the restraining member 6 become opposite to each other in the same direction. As a result, since a force for extracting the unit nursery bed 71 using the holding member 5 is effectively applied to this unit nursery bed 71, it is possible to improve reliability of extraction of the unit nursery bed 71.

The restraining member 6 is slidably supported, for example, by the frame 2 in a direction crossing the direction of separating the unit nursery bed 71 using the holding member 5. The restraining member 6 is moved to a position of a part of the unit nursery beds 71 (the remaining unit nursery beds 71) other than the separated unit nursery bed 71 at the time of separation of the unit nursery bed 71 using the holding member 5 as illustrated in FIGS. 8, 9A, and 9B to restrain a movement of the (remaining) unit nursery beds 71 not separated (claim 4). The "direction of separating the unit nursery bed 71" is, for example, the longitudinal direction of the frame 2, and the "crossing direction" is the width direction of the frame 2 perpendicular to the "separation direction" mainly.

The restraining member 6 prevents the unit nursery bed 71 from following the remaining unit nursery beds 71 when the holding member 5 separates the held unit nursery bed 71. Since the restraining member 6 restrains the movement of the remaining unit nursery beds 71 not separated by the holding member 5, it is possible to reliably perform the work of separating the target unit nursery bed 71 using the holding member 5.

Specifically, the holding member 5 has the main body 51 supported by the arm 8 supported by the frame 2 pivotally around a vertical axis and a pair of gripping claws 52 having tips openably/closably supported by the main body 51 (claim 1). The phrase "pivotally around a vertical axis"

means that the main body 51 is rotated to a positive or negative direction by virtue of an operation of a driving device such as a motor, for example, around an axis of the rod 9 described above.

For example, the main body 51 houses a power source such as the motor 56 that directly or indirectly opens or closes a pair of gripping claws 52 as illustrated in FIGS. 6A and 6B. A pair of gripping claws 52 are inserted from the opened lateral face (front face) side of the unit nursery bed 71 to both side positions of the width direction of the unit nursery bed 71 as illustrated in FIG. 7, that is, between the adjacent unit nursery beds 71 arranged in the width direction of the unit nursery bed 71 as illustrated in FIG. 8 when the holding member 5 holds the unit nursery bed 71 to be held. A pair of gripping claws 52 interpose each unit nursery bed 71 (one by one) in the width direction in this state, and separate it from the nursery bed 7 (seedling tray 3). In the illustrated example, the motor 56 is used to indirectly open or close a pair of gripping claws 52.

The main body 51 approaches the unit nursery bed 71 side from the state before the unit nursery bed 71 is interposed between a pair of gripping claws 52 as illustrated in FIG. 7 until the state in which the unit nursery bed 71 is interposed between a pair of gripping claws 52 as illustrated in FIGS. 9A and 9B. When the unit nursery bed 71 is interposed between the gripping claws 52, the main body 51 and the support member 53 described below are positioned above the unit nursery bed 71. Therefore, they do not make contact with (collide with) the unit nursery bed 71.

A pair of gripping claws 52 hold the unit nursery bed 71, for example, when they approach each other (closed) as illustrated in FIG. 6B. A pair of gripping claws 52 release the unit nursery bed 71 from the holding member 5 by receding from each other (opened) as illustrated in FIG. 6A. Specifically, since a pair of support members 53 that support the gripping claws 52 are pivotally supported by the main body 51 to be rotatable in a line symmetrical state to each other while being spaced apart (claim 5), it is possible to approach the pair of gripping claws 52 to each other when the pair of support members 53 are rotated in any direction around a horizontal axis with respect to the main body 51. In addition, it is possible to operate the pair of gripping claws 52 such that the pair of gripping claws 52 recede from each other when the pair of support members 53 are recovered (rotated reversely) to their original positions.

The "line symmetrical state" means that a pair of support members 53 are maintained in the line symmetrical state to each other with respect to a vertical center line (vertical direction) as the main body 51 is seen from the front face as illustrated in FIGS. 6A and 6B. Alternatively, approaching and receding operations may be possible by supporting a pair of support members that support the gripping claws slidably in a positive or negative direction (to be able to make a rectilinear motion (parallel translation)) on the main body with an interval and changing the distance between a pair of support members.

When a pair of support members 53 are pivotally supported by the main body 51 to be rotatable in a line symmetrical state (claim 5), the pair of support members 53 are formed, for example, in an L-shape or the like as the main body 51 is seen from the front face as illustrated in FIGS. 6A and 6B, and a corner portion of the L-shape is pivotally supported by the main body 51. As a result, a pair of gripping claws 52 approach each other as illustrated in FIG. 6B to hold (grip) the unit nursery bed 71 when the pair of support members 53 are swung in a line symmetrical state to each other (rotational motion) and are rotated in any direction. When the pair of support members 53 are recovered from the state rotated to any direction as illustrated in FIG. 6A, the pair of gripping claws 52 recede from each other to release the unit nursery bed 71.

Assuming that the support member 53 is formed in an L-shape or the like, when an intersection (corner portion) of the L-shape is pivotally supported by the main body 51, the gripping claws 52 are formed or coupled to the tip of the long side of the L-shape, and the support member 53 is swung with respect to the tip of the short side of the L-shape as a leveling point, the pivot support position becomes a fulcrum, and the tip of the gripping claw 52 becomes an action point.

In this case, if a distance from the pivotal support position (fulcrum) to the tip (action point) of the long side is set to be larger than a distance to the tip (leveling point) of the short side, it is possible to increase a movement distance of the leveling point to set it as the movement distance of the action point. Therefore, advantageously, it is possible to secure the distance between the tips of the pair of gripping claws 52 by amplifying the insignificant movement amount of the leveling point. For example, assuming that a pair of support members 53 are slidably supported by the main body 51, the movement amount of the gripping claws 52 and the movement amount of the support members 53 are equal when they are coupled to the tip of the support member 53. However, it is possible to increase the movement amount of the gripping claw 52 by using a rotational motion.

The seedling transplanter includes a seedling tray configured to support the nursery bed and the holding member supported by the frame that supports the hydroponic panel serving as a transplant destination of the unit nursery bed pivotally around a vertical axis and vertically movably to separate the unit nursery bed on the seedling tray from the nursery bed, hold the unit nursery bed, insert the unit nursery bed into the hole of the hydroponic panel, and release the unit nursery bed. In addition, the holding member holds the unit nursery bed arranged in the outermost side of the nursery bed from the front face side of the unit nursery bed in the width direction and separates the unit nursery bed from the nursery bed. Therefore, the unit nursery bed does not pass through the hole formed in the seedling tray unlike the case where the unit nursery bed is held from the bottom face side of the seedling tray. Accordingly, it is possible to remove or remarkably reduce a possibility of damaging the seedling planted in the unit nursery bed due to passing through the hole.

Since the holding member holds the unit nursery bed from both sides of the width direction, it is not necessary to apply a force (compression force) for extracting the unit nursery bed from the hole to the unit nursery bed unlike the case where the unit nursery bed is held from the bottom face side. Therefore, it is not necessary to maintain a strong force for holding the unit nursery bed using the holding member. As a result, it is possible to reduce a possibility of damaging a root of the seedling inside the unit nursery bed due to the compression force applied to the unit nursery bed.

DESCRIPTION OF EMBODIMENTS

Figure 1:
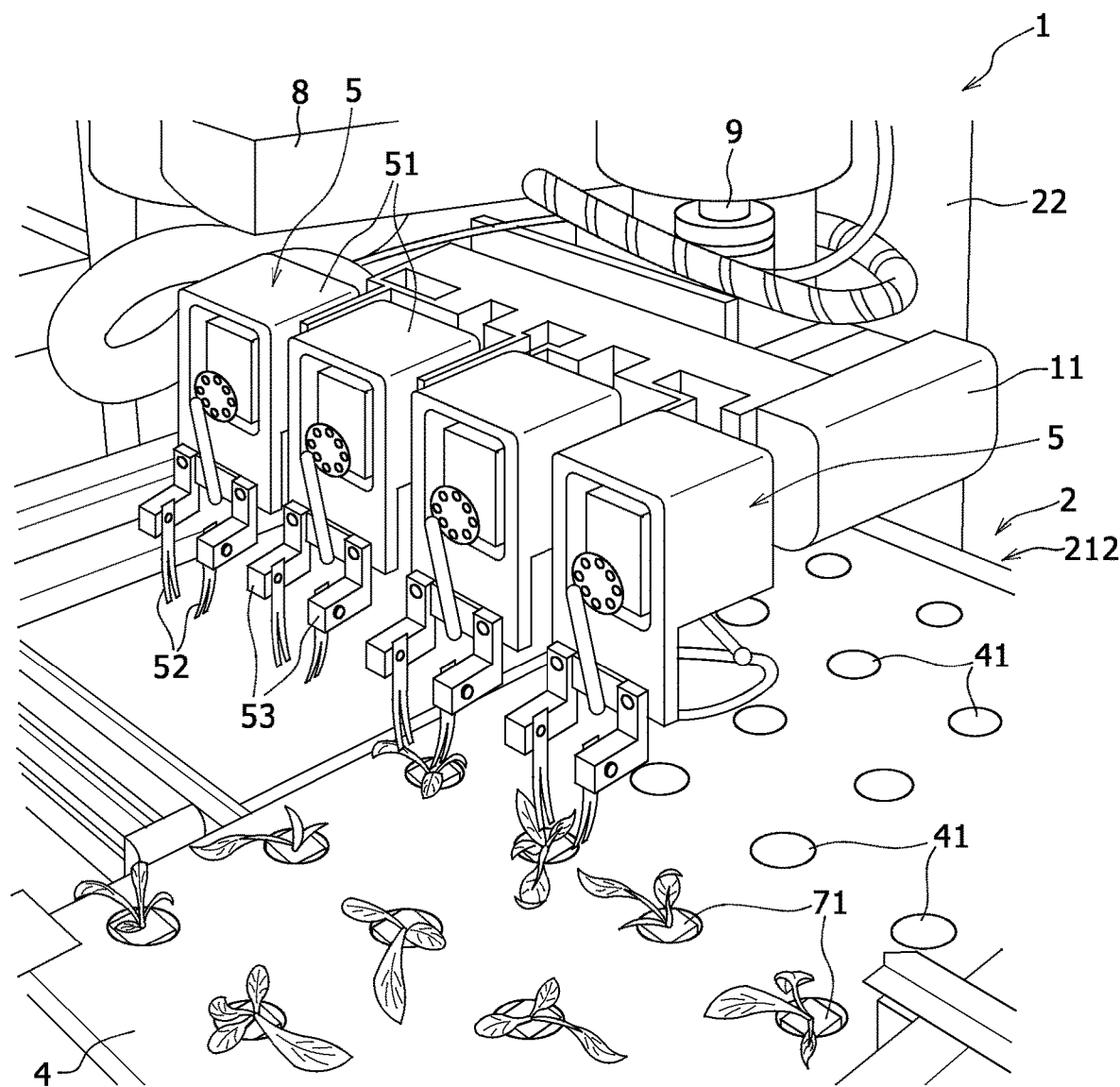
FIG. 1 is a perspective view illustrating a state after a plurality of holding members supported by a frame of a transplanter lower a unit nursery bed on a hydroponic panel and releases the unit nursery bed from the holding members.

FIGS. 1 to 4 illustrate a whole configuration of a transplanter 1 including a nursery bed 7 having unit nursery beds 71 in which seedlings are individually planted to be separable from each other, the unit nursery beds 71 being arranged in two directions on a plane, a seedling tray 3 that supports the nursery bed 7, a hydroponic panel 4 that serves as a transplant destination of the unit nursery bed 71 on the seedling tray 3, and a holding member 5 that holds a part of the unit nursery beds 71 on the seedling tray 3, separates them from the nursery bed 7, and lowers them onto the hydroponic panel 4.

Figure 10:
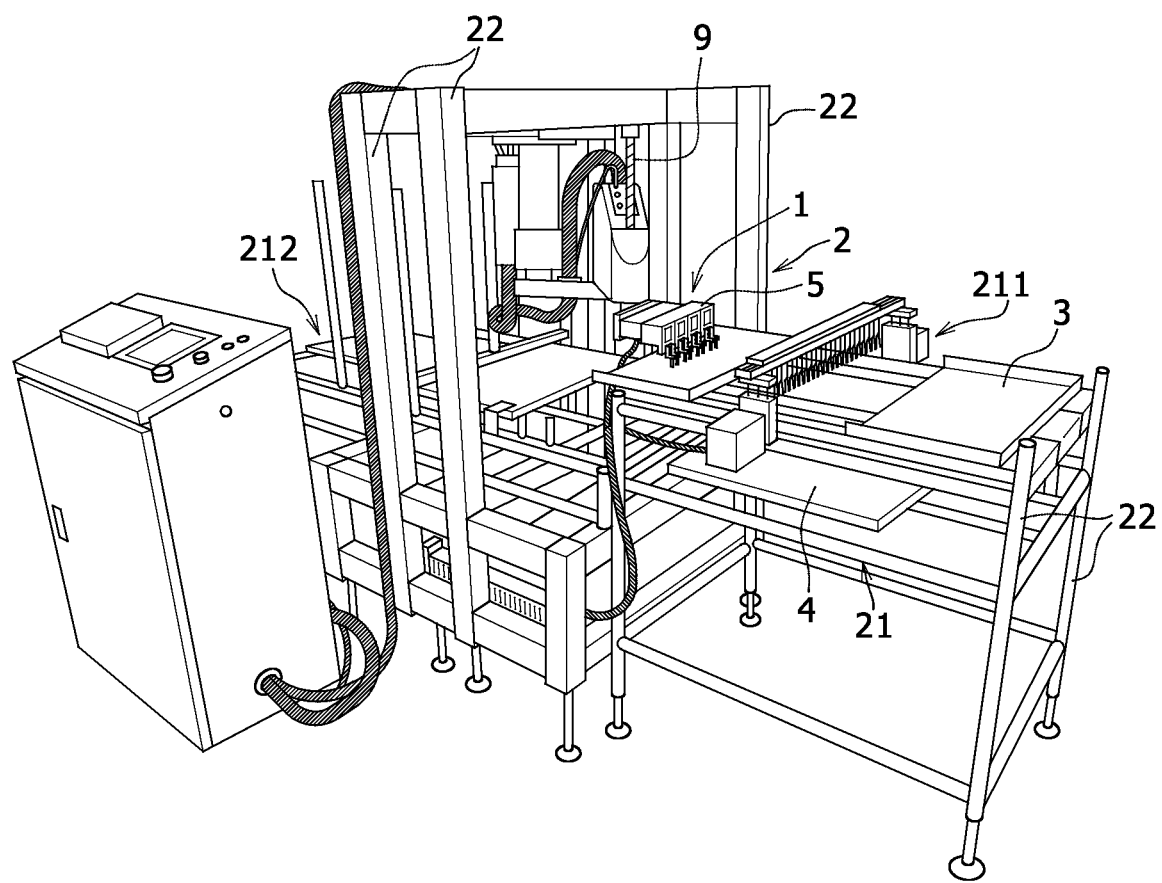
FIG. 10 is a perspective view illustrating the entire frame including the transplanter.

The seeding tray 3 and the hydroponic panel 4 are supported by the frame 2 having a three-dimensional shape illustrated in FIG. 10. The transplanter 1 is also supported by the frame 2 serving as a main body or backbone of the transplanter 1. FIGS. 1 to 4 also show the motions of the holding members 5. The seedling tray 3 and the hydroponic panel 4 are manufactured of synthetic resin such a continuous foaming material, and the unit nursery beds 71 are manufactured of a sponge-like material such as foamed polyurethane resin to impregnate the water stored on the seedling tray 3. The seeding includes a nursery tree.

The holding member 5 is supported by the frame 2 pivotally around a vertical axis and vertically movably. The holding members 5 are arranged in the outermost side of the nursery bed 7 on the seedling tray 3 to hold any one or a plurality of unit nursery beds 71 having a lateral face not adjacent (opened) to other unit nursery beds 71 from the lateral face side of the unit nursery bed 71 to a width direction of the unit nursery bed 71 and separate the unit nursery bed 71 from the nursery bed 7.

In the drawings, the lateral face of the unit nursery bed 71 to be held by the holding member 5 and not adjacent to other unit nursery beds 71 on the seedling tray 3 is a lateral face directed to the hydroponic panel 4 side. Therefore, this opened lateral face may also be referred to as a "front face". After separating the unit nursery bed 71, the holding member 5 inserts the held unit nursery bed 71 into the hole 41 provided in the hydroponic panel 4 and releases (transplant) it.

The pivoting of the holding member 5 around the vertical axis is generated such that an arm 8 supported by any part of the frame 2 pivotally around the vertical axis is pivoted around the vertical axis (rotated by receiving a drive force in a positive or negative direction). The lifting or lowering of the holding member 5 along the vertical axis (in a vertical direction) is generated by telescoping or lifting/lowering the vertical axis or the rod 9 corresponding to another vertical axis pivotally supported by the arm 8.

As illustrated in FIG. 10, the frame 2 is formed by three-dimensionally assembling a horizontal frame 21 having a longitudinal member and a transverse member arranged basically horizontally in two directions and bonded to each other, a vertical frame 22 bonded to the horizontal frame 21 in the vertical direction, and the like. The seedling tray 3 is supported by one side of the longitudinal direction of the horizontal frame 21, and the hydroponic panel 4 is arranged in the other side. The "longitudinal direction of the horizontal frame 21" or the "longitudinal direction of the frame 2" described below refers to a longitudinal direction of the frame 2 in FIG. 10 which illustrates the entire frame 2 (the whole picture) and indicates a juxtaposing direction of a plurality of holding members 5 in FIGS. 1, 3, and 4. The direction perpendicular to the "longitudinal direction of the frame 2" is the "width direction of the frame 2".

In the drawings, the horizontal frame 21 has a two-layer structure with different levels (heights) including an upper end horizontal frame 211 and a lower end horizontal frame 212 in order to smoothly perform lowering for inserting the unit nursery bed 71 into the hole 41 of the hydroponic panel 4 after a movement of pivoting to the hydroponic panel 4 from an operation of holding the unit nursery bed 71 on the seedling tray 3 by the holding member 5. In this case, the seedling tray 3 is arranged on the upper end horizontal frame 211, and the hydroponic panel 4 is arranged on the lower end horizontal frame 212. However, it is not always necessary to form the horizontal frame 21 in two layers.

The holding member 5 holds the unit nursery bed 71 on the seedling tray 3, is pivoted around the vertical axis, and is then lowered on the hydroponic panel 4 directly in the vertical direction in order to insert the unit nursery bed 71 into the hole 41 of the hydroponic panel 4. In this relationship, if the hydroponic panel 4 and the seedling tray 3 are positioned at the same level, insertion of the unit nursery bed 71 into the hole 41 by lowering is difficult. Therefore, when the holding member 5 is pivoted on the seedling tray 3, the holding member 5 is necessarily lifted once in front of the hydroponic panel 4 and is then lowered. In comparison, by positioning the level (arrangement height) of the hydroponic panel 4 under the level (arrangement height) of the seedling tray 3, it is possible to omit the lifting operation of the holding member 5 in front of the hydroponic panel 4.

Figure 6A:
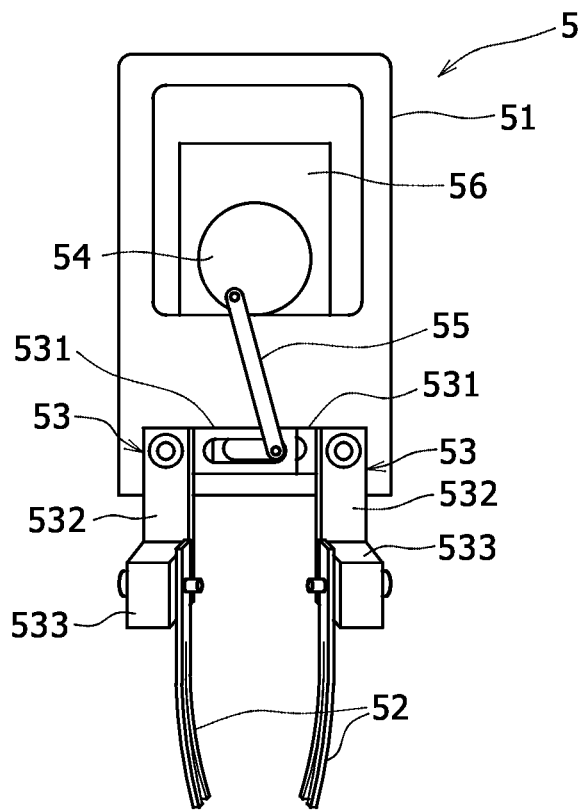
FIG. 6A is an elevation illustrating a detailed example of the holding member having a main body and a pair of gripping claws openably/closably supported by the main body to show a state in which a pair of gripping claws recede from each other (to release the unit nursery bed)
Figure 6B:
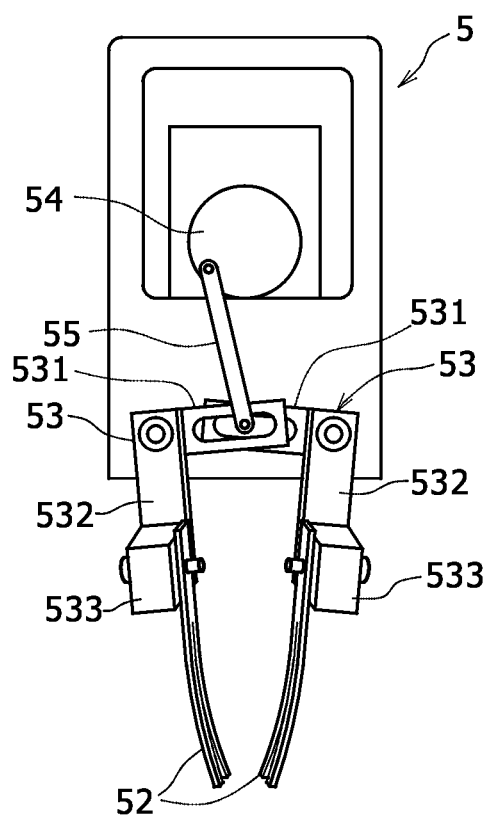
FIG. 6B is an elevation illustrating a state in which a pair of gripping claws of FIG. 6A approach each other (to hold the unit nursery bed)

As illustrated in FIGS. 1, 6A, 6B, and the like, the holding member 5 has a main body 51 supported by the arm 8 supported by any part of the frame 2 pivotally around the vertical axis, and a pair of gripping claws 52 having tips openably/closably supported by the main body 51. A pair of gripping claws 52 may be openably/closably supported directly by the main body 51 in some cases. However, in the drawings, as illustrated in FIGS. 6A and 6B, in order to amplify a direct operation amount and transmit it to the open/close operation of a pair of gripping claws 52, the gripping claws 52 are indirectly supported by the main body 51 by interposing the support members 53. In this case, the pair of gripping claws 52 are coupled to respective support members 53 (pivotally supported), so that the gripping claws 52 are opened or closed as the pair of support members 53 are directly operated.

Specifically, a pair of support members 53 that support the gripping claws 52 are maintained in a line symmetrical state with an interval from each other in an width direction of the main body 51 and are pivotally supported to be rotatable with respect to the main body 51. In this example, when a pair of support members 53 are rotated in any direction, a pair of gripping claws 52 approach each other. When a pair of support members 53 are recovered to their original positions (rotated reversely), a pair of gripping claws 52 recede from each other.

Since the gripping claws 52 are indirectly supported by the main body 51 via the support members 53, a margin is given to a motion of the gripping claws 52. Therefore, when the gripping claws 52 are closed, a clearance is easily generated between the gripping claws 52, and a gripping force (compression force) for holding the unit nursery bed 71 is moderated advantageously.

In the example of FIGS. 6A and 6B, an elevation shape of the support member 53 as the holding member 5 is seen in a front view has an L-shape having a long side portion and a short side portion, and the support member 53 is pivotally supported by the main body 51 at an intersecting position between the long side portion and the short side portion. In addition, the gripping claw 52 is coupled to the tip of the long side portion (pivotally supported). As illustrated in FIGS. 6A and 6B, a front face of the holding member 5 indicates a face of the side where the support member 53 is supported by the main body 51 and also indicates the front face of the main body 51.

A long hole is formed in the longitudinal direction of the short side portion of a pair of support members 53 (in the axial direction of the short side (horizontal direction)), and the short side portions are overlapped. In addition, a connecting rod 55 pivotally supported by a crank 54 that makes a rotational motion is pivotally supported by the overlapping long hole. As a result, a rotational motion of the crank 54 is converted into a vertical motion of the connecting rod 55, so that in response to the vertical motion of the connecting rod 55, a pair of support members 53 can be switched between an approaching state (FIG. 6B) and a receding state (FIG. 6A). The rotational motion of the crank 54 is operated by a motor 56 or the like housed in the main body 51.

When the long side portion is rotated (swung) around the pivotal support position by lifting or lowering the short side portion of the support member 5 as the holding member 5 is seen from the front side as illustrated in FIGS. 6A and 6B, it is possible to amplify a vertical movement distance of the short side portion and transmit it as a horizontal movement amount in the event of rotation of the long side portion. As a result, it is possible to obtain a necessary movement distance in the event of the open/close operation of a pair of gripping claws 52 while suppressing a rotation angle of the crank 54, that is, a vertical movement distance of the connecting rod 55.

Figure 7:
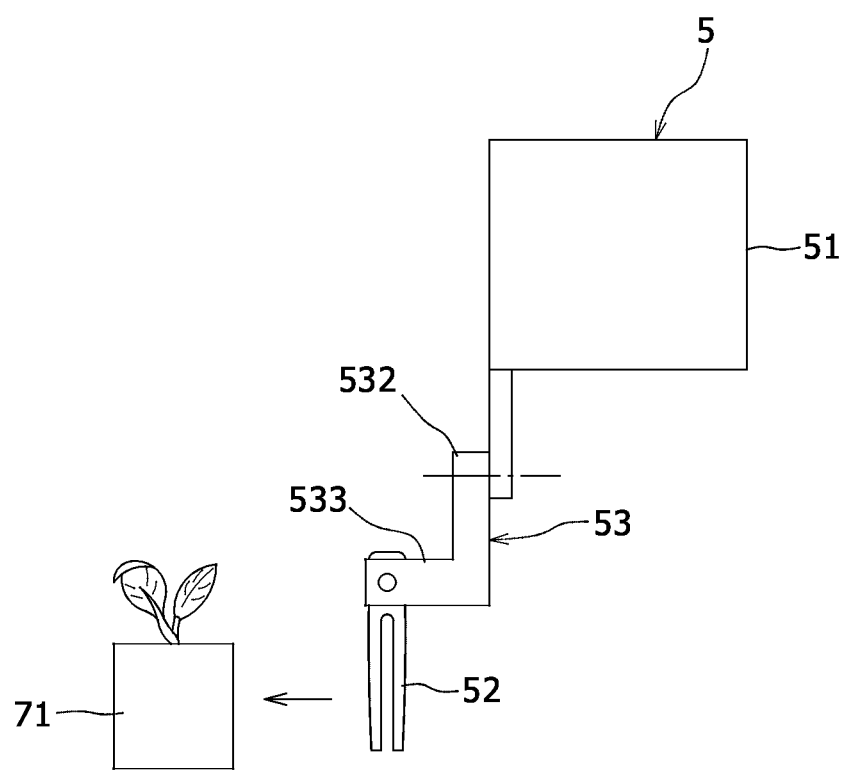
FIG. 7 is a side view illustrating a motion (rectilinear motion) of the holding member when the gripping claws of the holding member of FIG. 6A or 6B hold the unit nursery bed.
Figure 8:
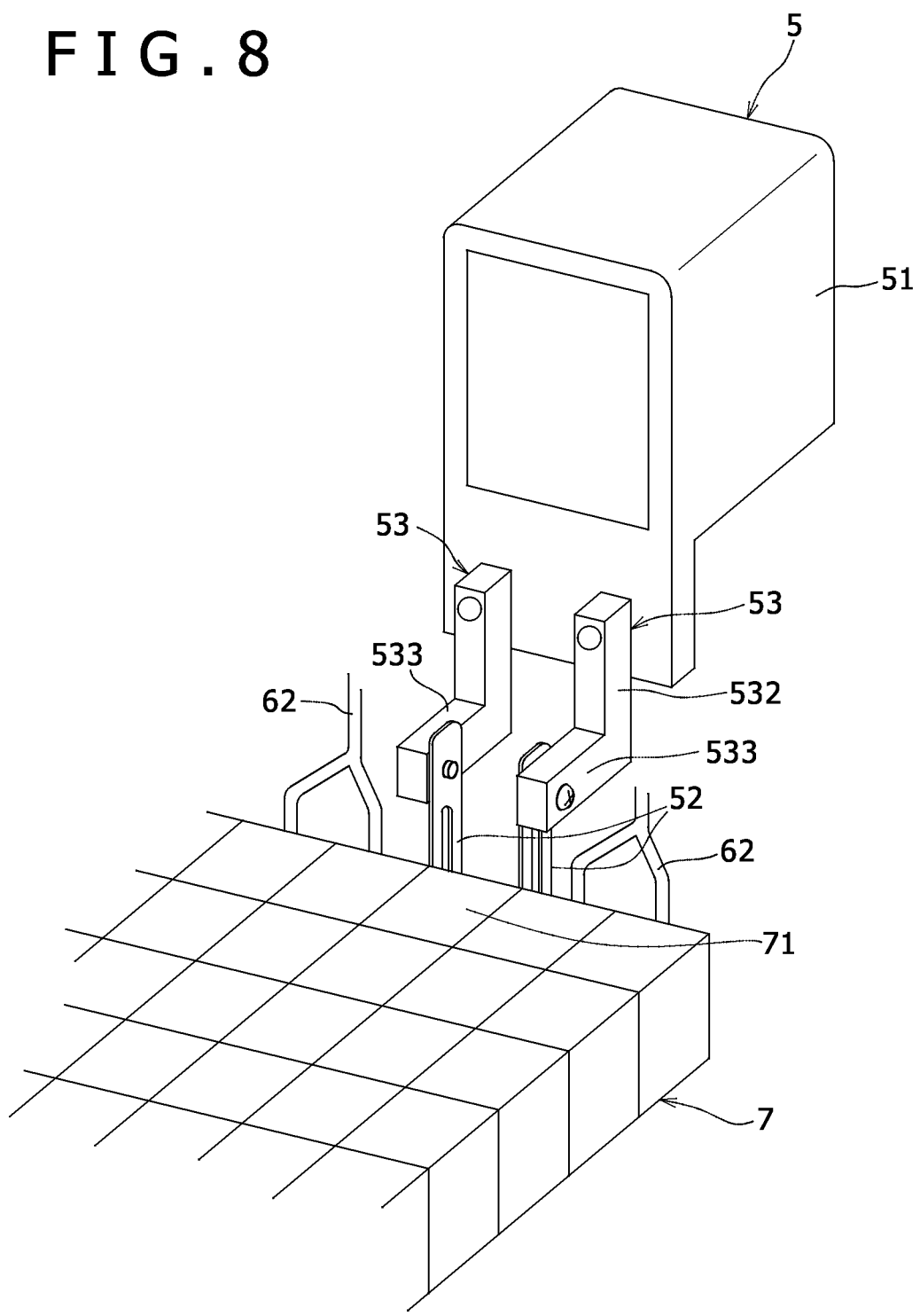
FIG. 8 is a perspective view illustrating a state immediately before the unit nursery bed is interposed between a pair of gripping claws of the holding member of FIG. 7 and a relationship of the restraining member.

In the example of FIGS. 6A and 6B, the long side portion of the support member 53 as seen in the front view is formed in an L-shape as also seen in the side view as illustrated in FIGS. 7 and 8. In addition, the gripping claw 52 is connected to the short side portion continuous to the unit nursery bed 71 side to be held in the lower end of the long side portion as seen in the side view. In this configuration, when the support members 53 are supported by the front face of the main body 51 while lateral faces of a pair of support members 53 face each other in the lateral direction (direction for interposing the unit nursery bed 71), a pair of gripping claws 52 face each other in the lateral direction of the support member 53.

Figure 9A:
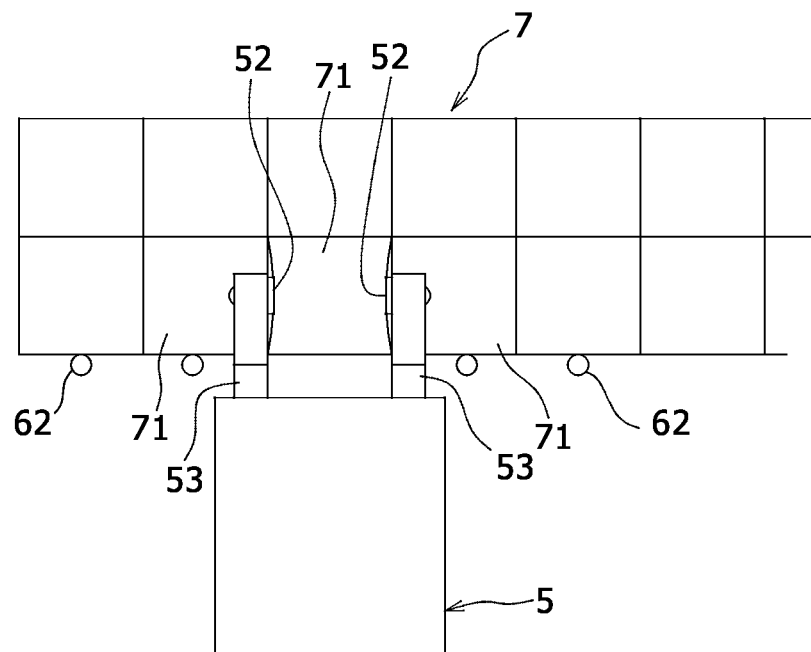
FIG. 9A is a plan view illustrating a state in which the unit nursery bed is interposed between a pair of gripping claws of the holding member of FIG. 8.
Figure 9B:
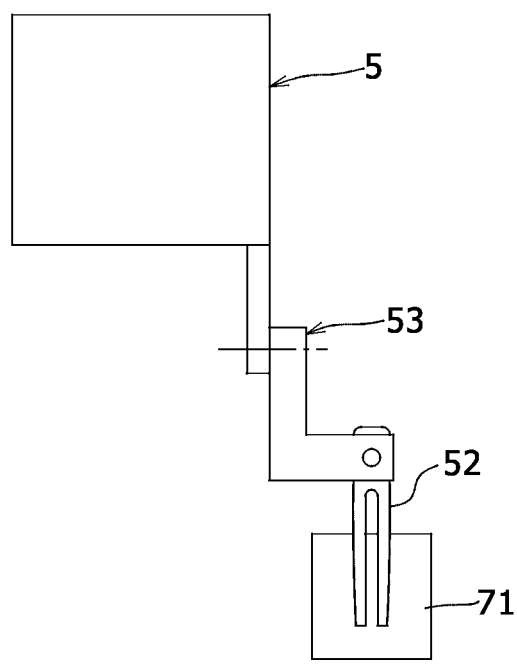
FIG. 9B is a side view of FIG. 9A.

As a result, a pair of gripping claws 52 overhang from the main body 51 to the unit nursery bed 71 side as illustrated in FIGS. 7 and 8. Therefore, when a pair of gripping claws 52 hold the unit nursery bed 71 by interposing it, only a pair of gripping claws 52 is inserted into a boundary surface between the unit nursery bed 71 to be held and the unit nursery bed 71 adjacent thereto in the width direction (between the lateral faces of the adjacent unit nursery beds 71) as illustrated in FIGS. 8 and 9, so as to prevent the main body 51 from making contact with the front face (opened lateral face) of the unit nursery bed 71 and compressing the unit nursery bed 71. In FIGS. 7, 8, 9A, and 9B, the vertical movement portion 531 described below as a short side portion of the support member 53 as seen in the front view of FIGS. 6A and 6B is not illustrated for simplicity purposes.

In summary, in the example illustrated in FIGS. 6A and 6B and the like, each of the pair of support members 53 has three portions including a vertical movement portion 531, overlapping with the paired support member 53 in the front direction of the holding member 5 and corresponding to the short side portion as seen in the front view. The other two portions are a pivotal support portion 532 overhanging to the front side (the unit nursery bed 71) side at a pivotal support position of the vertical movement portion 531 to the main body 51 and corresponding to the long side portion as seen in the front view, and a holding portion 533 overhanging from the lower end of the pivotal support portion 532 to the front side and corresponding to the short side portion as seen in the side view. The pivotal support portion 532 is also a long side portion as the support member 53 is seen in the side view. The connecting rod 55 is coupled to the overlapping vertical movement portions 531 of a pair of support members 53, and the vertical movement portions 531 are lifted or lowered in synchronization with a vertical movement of the connecting rod 55.

The gripping claw 52 is coupled to, for example, the lateral face of the respective holding portion 533 (perpendicular to the front face) or the like, and a pair of gripping claws 52 supported by the holding portions 533 of a pair of support members 53 are paired to hold the unit nursery bed 71 by gripping (interposing) the unit nursery bed 71 in the width direction. As the gripping claw 52 is pivotally supported on the lateral face of the holding portion 533, an axial direction of the pivotal support of the gripping claw 52 becomes perpendicular to an axial direction of the pivotal support of the pivotal support portion 532 to the main body 51.

Since a pair of gripping claws 52 are pivotally supported by the holding portions 533 in the upper ends thereof, the pair of gripping claws 52 have a suspended state from the holding portions 533. In addition, when a pair of gripping claws 52 have an opened state as illustrated in FIG. 6A, it is possible to moderate and adjust a holding force (compression force) applied to the unit nursery bed 71 from a pair of gripping claws 52 to interpose the unit nursery bed 71 by loosely coupling the gripping claws 52 to the holding portion 533. The phrase "loosely coupling the gripping claws 52 to the holding portion 533" means that, specifically, the gripping claws 52 are connected by rotationally displacing it relatively around a horizontal axis in the axial direction of the holding portion 533 (perpendicular to the front face of the main body 51) or rotationally displacing it relatively around an axis perpendicular to the axial direction of the holding portion 533.

The holding member 5 is arranged in the outermost side of the nursery bed 7 over the seedling tray 3 to hold any one or a plurality of unit nursery beds 71 having a lateral face (front face) not adjacent (opened) to the unit nursery bed 71. In this relationship, whether or not the holding member 5 holds the unit nursery bed 71 arranged on any opened lateral face (front face) side of the nursery bed 7 as the seedling tray 3 is seen in the front view may be arbitrarily set.

However, in the drawings, from the viewpoint of efficiency of the movement amount (movement distance) of the holding member 5, a line of a plurality of unit nursery beds 71 to be held in the width direction of the frame 2 are arranged such that the lateral faces (front faces) of a line of the target unit nursery beds 71 to be held by the holding members 5 are directed toward the hydroponic panel 4 side on the seedling tray 3. Since the lateral faces (front faces) directed to the hydroponic panel 4 side on the seedling tray 3 are the face where the unit nursery beds 71 to be held by the holding members 5 are arranged, they may also be referred to as a "front face of the seedling tray 3".

Figure 4:
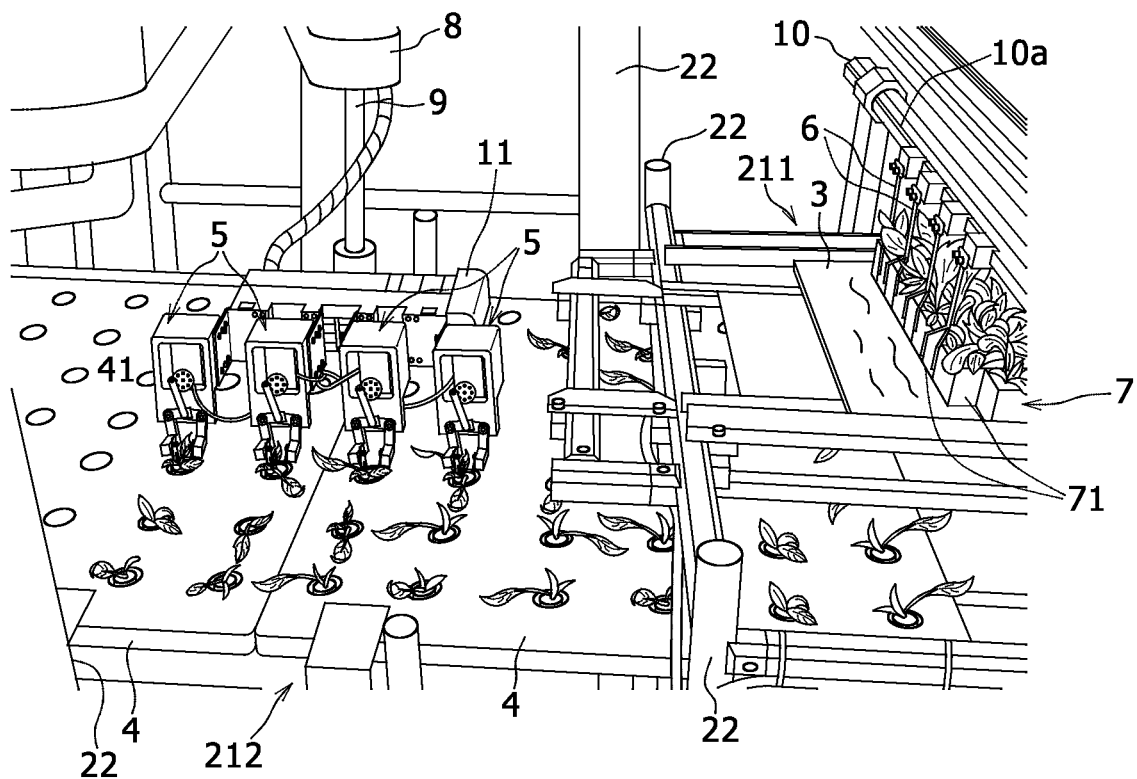
FIG. 4 is a perspective view illustrating a state in which the unit nursery bed held by the plurality of holding members of FIG. 3 is inserted into the hole of the hydroponic panel.

Also in the drawings, from the viewpoint of work efficiency of the holding member 5 using the arm 8, rotation (pivoting) of 90° around the vertical axis allows the unit nursery beds 71 to be held on the seedling tray 3 and allows the unit nursery beds 71 to be released on the hydroponic panel 4. Specifically, as illustrated in FIG. 4, a line of a plurality of unit nursery beds 71 held by a plurality of holding members 5 positioned above the hydroponic panel 4 is arranged perpendicularly (in the longitudinal direction of the frame 2) to a line of the unit nursery beds 71 to be held on the seedling tray 3 (in the width direction of the frame 2). In this relationship, the holes 41 to which a plurality of unit nursery beds 71 released from a plurality of holding members 5 for transplanting to the hydroponic panel 4 are inserted are arranged at intervals in the longitudinal direction of the frame 2.

Since the holding member 5 is pivotally supported by the arm 8 around the vertical axis, the holding member 5 basically moves by pivoting between the seedling tray 3 and the hydroponic panel 4. In the drawings, a plurality of holding members 5 are juxtaposed in their width direction of the holding members 5 and are supported by the arm 8 using a control device 11 that controls a distance between the adjacent holding members 5. However, a plurality of holding members 5 are not necessarily supported by the control device 11.

For example, assuming that a control start timing is set to when the holding members 5 are arranged as illustrated in FIG. 1, a series of operations including a movement of the holding member 5 above the hydroponic panel 4 toward the seedling tray 3 by pivoting around the vertical axis, a stop operation above the seedling tray 3, a rectilinear motion (forward movement) toward the unit nursery bed 71 side to be held, and a manipulation (operation) of holding the unit nursery beds 71 by closing a pair of gripping claws 52 are controlled by a controller provided in any part of the frame 2. The controller may also be embedded in the control device 11.

The controller continuously controls subsequent operations including a movement of the holding member 5 to the hydroponic panel 4 by pivoting around the vertical axis, an operation of lowering and stopping the holding member 5 on the hydroponic panel 4, an operation of adjusting an interval between a plurality of holding members 5 juxtaposed in the width direction, an operation of releasing (transplanting) the unit nursery bed 71 by opening a pair of gripping claws 52, and an operation of lifting the holding member 5 above the hydroponic panel 4, pivoting around the vertical axis, and recovering to the stop state above the seedling tray 3.

Image information is transmitted from a camera installed in the holding member 5, the control device 11, or the arm 8 to the controller. If a plurality of holding members 5 are provided, the camera is installed in the unit of each holding member 5. The controller determines whether or not each holding member 5 is placed in a position suitable for each operation including an operation of holding the unit nursery bed 71 by closing a pair of gripping claws 52 when each holding member 5 is placed in a position of the seedling tray 3, an operation of releasing the unit nursery bed 71 by opening a pair of gripping claws 52 when the holding member 5 is placed at the position of the hydroponic panel 4, and a recovering operation to the position of the seedling tray 3, so that each operation is controlled on the basis of this determination.

The number of the unit nursery beds 71 on the seedling tray 3 is reduced as the holding member 5 holds the unit nursery bed 71 on the seedling tray 3. Therefore, the unit nursery bed 71 is supplied from the side opposite to the hydroponic panel 4 and is delivered to the front side of the seedling tray 3 whenever the holding member 5 performs the holding on the seedling tray 3 (in every time).

Here, an operational sequence of the holding member 5 including operations of holding the unit nursery bed 71 on the seedling tray 3, moving to the hydroponic panel 4, releasing (transplanting) the unit nursery bed 71 into the hole 41 of the hydroponic panel 4, and then recovering to the seedling tray 3 will be described with reference to FIGS. 1 to 4.

FIG. 1 illustrates a state in which a plurality of holding members 5 completely insert (transplant) a plurality of unit nursery beds 71 into a plurality of holes 41 of the hydroponic panel 4 arranged at intervals in the longitudinal direction of the frame 2 and release the unit nursery beds 71 from a pair of gripping claws 52. In FIG. 1, in particular, immediately after a pair of gripping claws 52 release the unit nursery bed 71 from the gripping claws 52, the holding member 5 is lifted vertically, and then, a plurality of holding members 5 moves forward (rectilinear motion (parallel translation)) by a predetermined length toward the front side to prepare a movement (pivoting and rectilinear motion) to the seedling tray 3.

In the state of the unit nursery bed 71 released from a pair of gripping claws 52 in FIG. 6A, the distance between a pair of gripping claws 52 increases, compared to a case where the unit nursery bed 71 of FIG. 6B is held (interposed) on the seedling tray 3 and is moved to the hydroponic panel 4.

Figure 2:
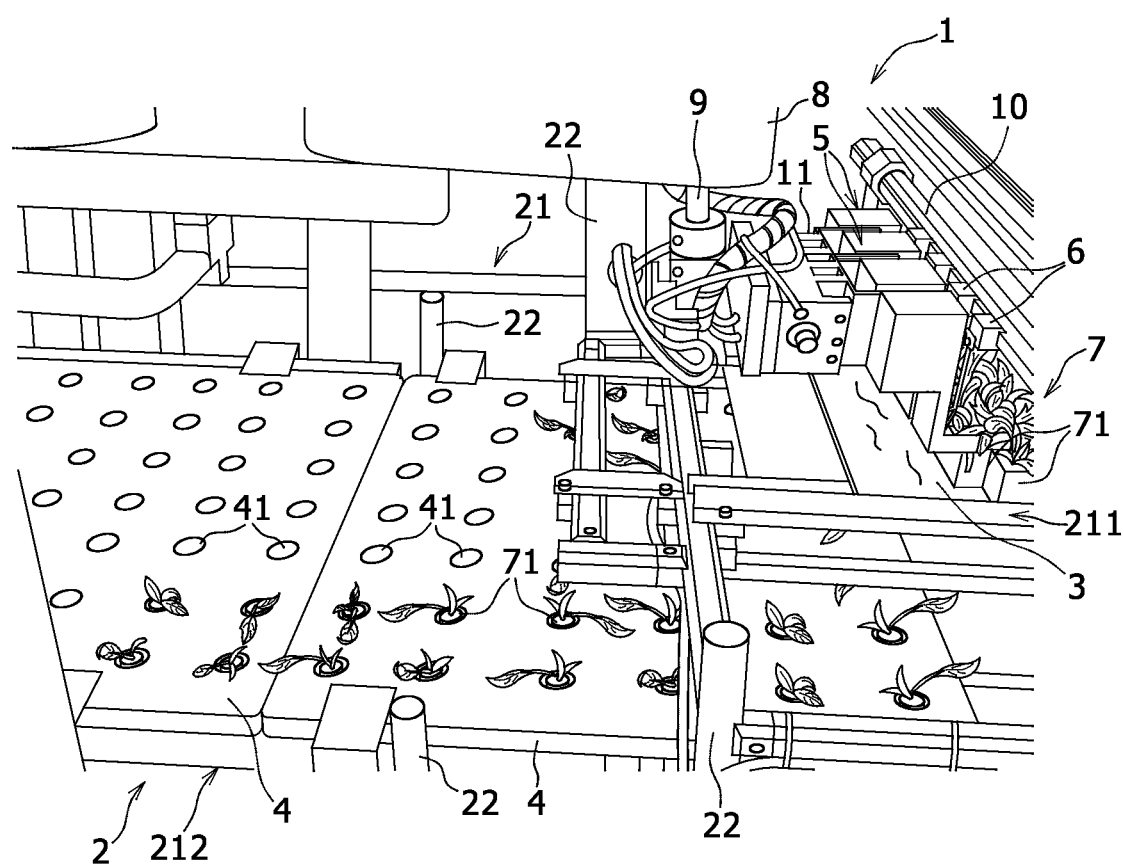
FIG. 2 is a perspective view illustrating a state in which the plurality of holding members of FIG. 1 move to the seedling tray and hold the unit nursery bed to be held from both sides of a width direction.
Figure 3:
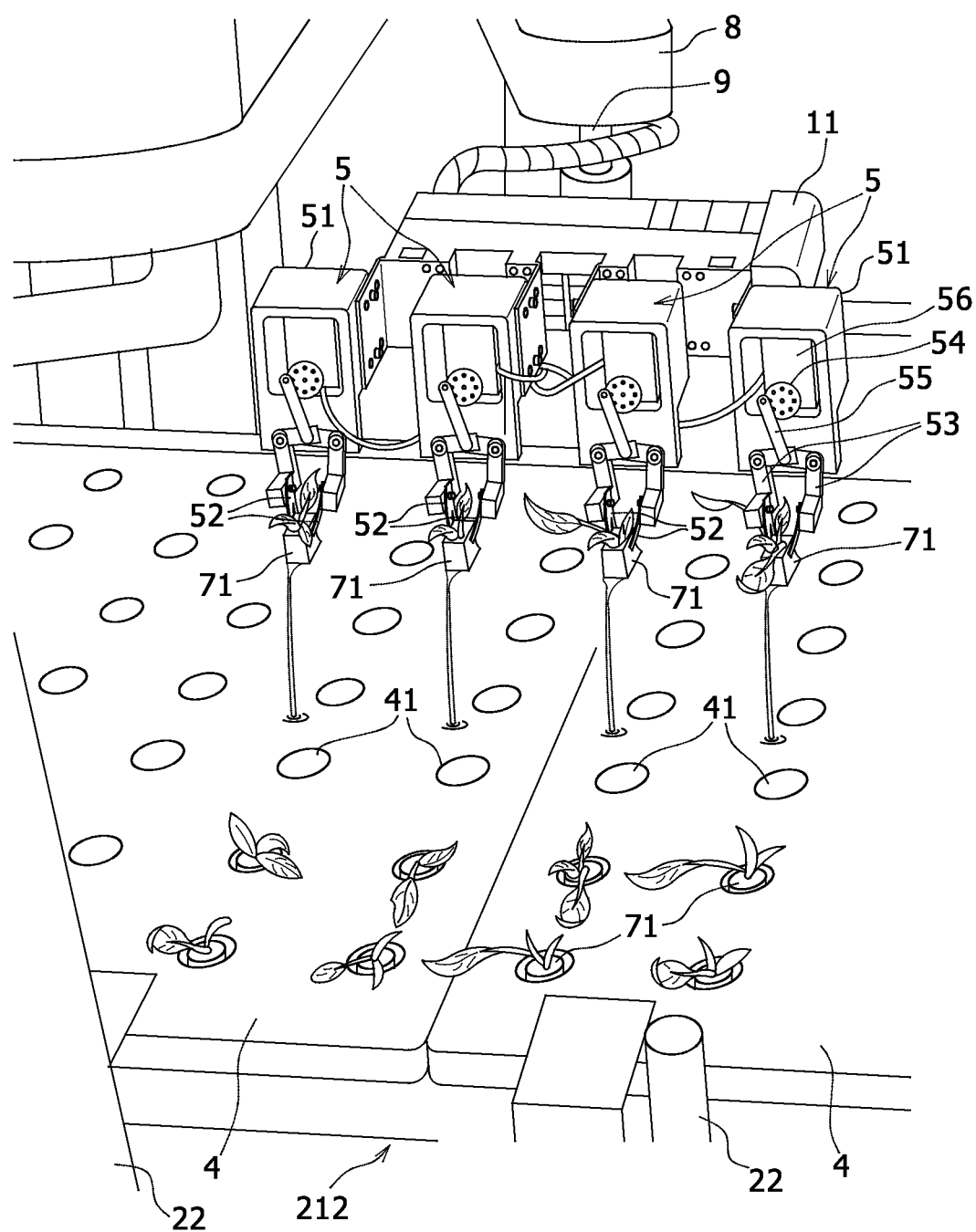
FIG. 3 is a perspective view illustrating a state in which the plurality of holding members of FIG. 2 rotate around a vertical axis of the frame to move the held unit nursery bed onto the hydroponic panel before lowering.

In the illustrated example, in anticipation of growth of the seedings as described below, a distance between the holding members 5 adjacent in the width direction when a plurality of holding members 5 insert the unit nursery beds 71 into the holes 41 of the hydroponic panel 4 is larger than the distance between the holding members 5 adjacent when the holding members 5 hold the unit nursery beds 71 on the seedling tray 3. In other words, the adjacent holding members 5 make contact with each other or approach each other, or the distance between the holding members 5 is small when holding the unit nursery bed 71 on the seeding tray 3 as illustrated in FIG. 2. In comparison, when the unit nursery bed 71 is moved onto the hydroponic panel 4, the distance between the holding members 5 becomes larger as illustrated in FIG. 3.

In this relationship, the distance between the adjacent holding members 5 is reduced to match the distance between the unit nursery beds 71 to be held on the seedling tray 3 when, before, or after the holding members 5 move forward to prepare movement to the seedling tray 3 after completely inserting the unit nursery beds 71 into the holes 41.

The distance between the transplantation holes 41 of the unit nursery beds 71 formed in the hydroponic panel 4 with intervals in the longitudinal direction of the frame 2 is set to be larger than the distance between centers (between seedlings) of the unit nursery beds 71 adjacent on the seedling tray 3 in consideration of growth of the seedling in the unit nursery bed 71. A plurality of holding members 5 of FIG. 1 are rotated by 90° from the arrangement direction (the width direction of the frame 2) for holding a plurality of unit nursery beds 71 on the seedling tray 3, and are arranged perpendicularly to the arrangement direction (the longitudinal direction of the frame 2) of a plurality of unit nursery beds 71 on the seedling tray 3 toward the width direction.

FIG. 1 illustrates a state after the unit nursery beds 71 held by the respective holding members 5 arranged to make contact with (abut on) each other in the width direction of the unit nursery bed 71 on the seedling tray 3 are separated from each other in the width direction (into a non-contact state), the unit nursery beds 71 are inserted into the holes 41, and a pair of gripping claws 52 of the respective holding member 5 are opened to release the respective unit nursery beds 71 (placed in the holes 41). In the drawings, four holding members 5 are juxtaposed such that the distance between the holding members 5 adjacent in the width direction can be adjusted (increased or decreased). However, the number of the juxtaposed holding members 5 may be set arbitrarily.

When the holding members 5 hold the unit nursery beds 71 on the seedling tray 3, (the lateral faces of) the unit nursery beds 71 adjacent in the width direction of the unit nursery bed 71 make contact with (abut on) each other as illustrated in FIGS. 2 and 8. In this regard, since the distance between the holes 41 adjacent in the longitudinal direction of the frame 2 of the hydroponic panel 4 is larger than the distance between the centers of the unit nursery beds 71 on the seedling tray 3 as described above, the distance between a plurality of adjacent holding members 5 increases when the holding members 5 move to the hydroponic panel 4 and then releases the unit nursery beds 71, compared to when the holding members 5 hold the unit nursery beds 71 on the seedling tray 3.

Figure 5:
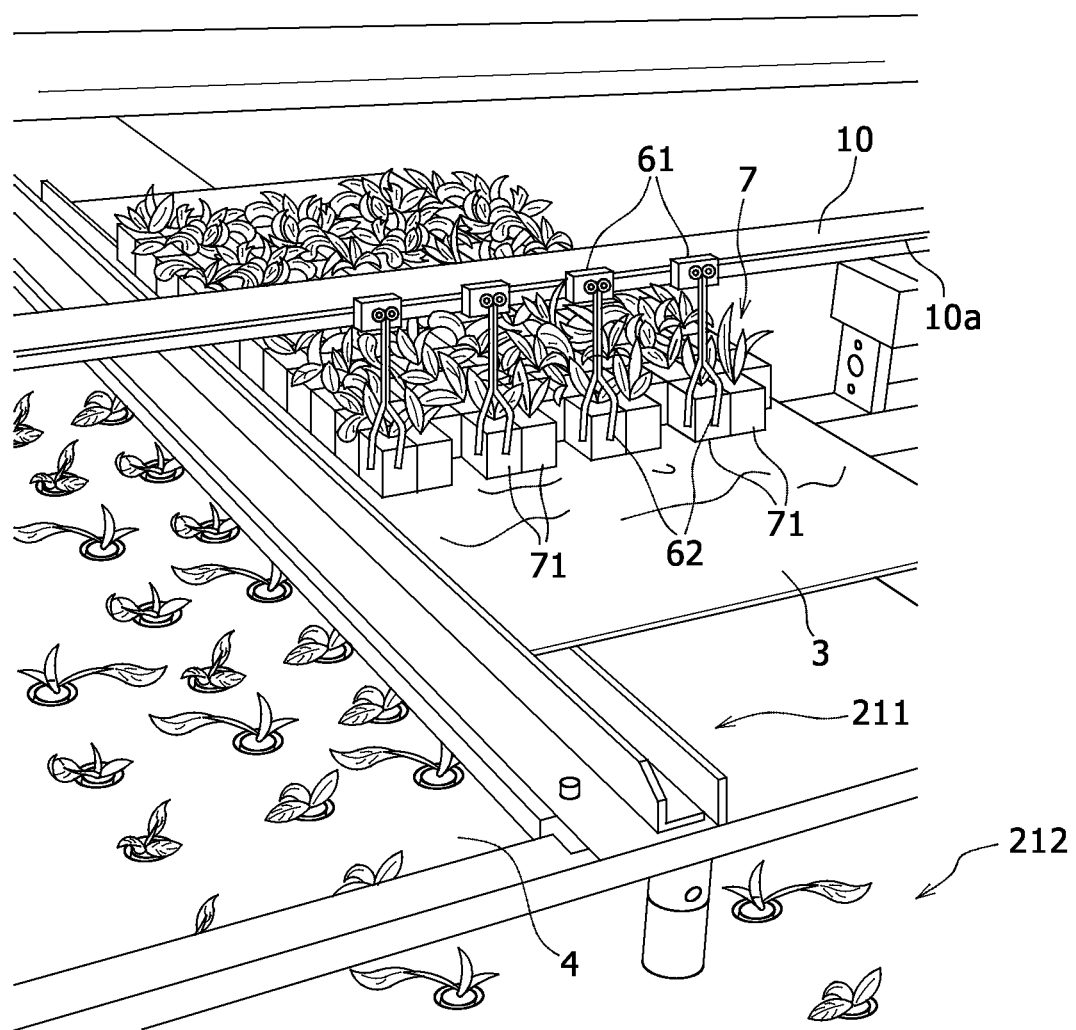
FIG. 5 is a perspective view illustrating a state in which a unit nursery bed other than the unit nursery bed held by the holding member is pressed by a restraining member to stop on the seedling tray when the holding member holds the unit nursery bed on the seedling tray.

In the drawings, out of a plurality of unit nursery beds 71 arranged in the width direction of the frame 2 by making contact with each other in the hydroponic panel 4 side on the seedling tray 3, the holding members 5 hold the unit nursery beds 71 alternately (skipping) or every other ones arranged in the width direction of the frame 2 as illustrated in FIG. 5 for holding easiness purposes when the unit nursery beds 71 are held by the holding members 5.

In this manner, when a plurality of holding members 5 hold a plurality of unit nursery beds 71 arranged alternately or more in the width direction of the frame 2 on the seedling tray 3, the distance between the holes 41 of the hydroponic panel 4 adjacent in the longitudinal direction of the frame 2 is not necessarily larger than the center-to-center distance between a plurality of adjacent unit nursery beds 71 to be simultaneously held on the seedling tray 3.

However, in the drawings, the distance between the adjacent holding members 5 at the time of releasing the unit nursery beds 71 on the hydroponic panel 4 is set to be larger than the distance between the adjacent holding members 5 at the time of holding the unit nursery beds 71 on the seedling tray 3. This means that the distance between the holes 41 of the hydroponic panel 4 adjacent in the longitudinal direction of the frame 2 is set to be sufficiently large in consideration of the growth of the seedlings.

From the state of FIG. 1, the front face of the holding member 5 in the side where the gripping claws 52 overhang is pivoted by 90° around the vertical axis as illustrated in FIG. 2 toward the seedling tray 3 side, and faces the target unit nursery bed 71 to be held by the holding member 5 in the next time on the seedling tray 3.

A pair of gripping claws 52 are opened to a distance (size) corresponding to the width of the unit nursery bed 71 before facing the next unit nursery bed 71, and the holding member 5 directly makes a rectilinear motion (moves forward) toward the unit nursery bed 71 side as illustrated in FIGS. 7 and 8, so that a pair of gripping claws 52 are inserted into both sides of the width direction of the unit nursery bed 71 as illustrated in FIG. 9A. In this case, in response to an upward movement of the connecting rod 55 caused by the rotation of the crank 54, the distance between a pair of gripping claws 52 is reduced as illustrated in FIG. 6B to hold (grip) the unit nursery bed 71 in the width direction.

When the holding member 5 has the state of FIG. 7 immediately before the state of FIG. 2, the controller checks, on the basis of the image of the camera, "whether or not the unit nursery bed 71 to be held is positioned to face the front face of the holding member 5" and "whether or not a pair of gripping claws 52 are positioned (opened) in both sides of the width direction of the unit nursery bed 71 to be held". After the check, the controller causes the holding member 5 to approach (advance toward) the unit nursery bed 71 side, drives the motor 56 to lift the connecting rod 55 by rotating the crank 54, and reduces the distance between a pair of gripping claws 52 to hold the unit nursery bed 71.

From the state of FIG. 2 in which a pair of gripping claws 52 hold the unit nursery bed 71, in order to separate the held unit nursery bed 71 from the nursery bed 7 on the seedling tray 3, the holding member 5 makes a rectilinear motion backward (retreats) oppositely to a direction facing the unit nursery bed 71 with respect to the nursery bed 7 to separate the unit nursery bed 71 held by the holding member 5 from other unit nursery beds 71. Then, as the arm 8 is pivoted by 90° around the vertical axis, a plurality of holding members 5 are juxtaposed along the arrangement direction of the holes 41 of the hydroponic panel 4 (in the longitudinal direction of the frame 2) toward a direction (in the width direction of the frame 2) perpendicular to a direction (in the longitudinal direction of the frame 2) where the front face of the holding member 5 faces the unit nursery bed 71 on the seedling tray 3 as illustrated in FIG. 3.

When the unit nursery bed 71 held by the holding member 5 is separated from other unit nursery beds 71, restraining members 6 for restraining the unit nursery beds 71 in their original positions on the seedling tray 3 make contact with the front faces of other unit nursery beds 71 that are not held by the holding members 5 and press other unit nursery beds 71 in the front side as illustrated in FIGS. 4 and 5 in order to facilitate separation of the held unit nursery bed 71. The "front face of other unit nursery bed 71" is a face of the unit nursery bed 71 facing the holding member 5 and also a face of the side (front face) arranged in the outermost side of the nursery bed 7 and not adjacent to the unit nursery bed 71 out of the nursery beds 7 arranged on the seedling tray 3.

As illustrated in FIGS. 2, 4, and 5, the restraining member 6 is slidably supported by the frame 2 in a direction crossing the direction of separating the unit nursery bed 71 using the holding member 5 (the longitudinal direction of the frame 2), that is, in the width direction of the frame 2 in the illustrated example, for example, in the width direction of the frame 2. Specifically, a part of the restraining member 6 is inserted into, for example, a groove 10a formed continuously in the axial direction of a guide bar 10 stretched in the width direction of the frame 2. Alternatively, the restraining member 6 is slidably supported in the width direction of the frame 2 along the axial direction of the guide bar 10 by slidably gripping a rail protruding continuously on the surface of the guide bar 10 or the like.

The restraining member 6 is controlled to move toward a part of the remaining unit nursery beds 71 other than the separated unit nursery bed 71 and press the front face of the holding member 5 side when the unit nursery bed 71 is separated using the holding member 5. In FIGS. 2, 4, 5, and the like, the restraining member 6 has two parts including a sliding portion 61 slidable along the guide bar 10 and a Y-shaped restraining portion 62 suspended from the sliding portion 61 to make contact with the front face of the unit nursery bed 71. However, the restraining member 6 or the restraining portion 62 may have any shape.

In the state of FIG. 3, the distance between a plurality of adjacent holding members 5 matching the positions of each holes 41 of the hydroponic panel 4 arranged in the longitudinal direction of the frame 2 is larger than the distance between the holding members 5 in a state that a plurality of unit nursery beds 71 are held on the seedling tray 3 as described above. FIG. 3 also illustrates a state in which the water stored from each unit nursery bed 71 on the seedling tray 3 and impregnated in the unit nursery bed 71 drops.

In the state of FIG. 3, the controller checks, on the basis of the image of the camera, "whether or not a distance between centers of the unit nursery beds 71 held by the adjacent holding members 5 matches a distance between the holes 41 arranged at intervals in the longitudinal direction of the frame 2" and "whether or not the unit nursery beds 71 are positioned over the holes 41". After the check, the controller lowers the holding member 5 by expanding the rod 9 or the like as illustrated in FIG. 4 to place the unit nursery bed 71 held by the holding member 5 on the hole 41 and insert the unit nursery bed 71 into the hole 41.

After lowering the holding member 5, the motor 56 is driven to lower the connecting rod 55 by rotating the crank 54 to increase the distance between a pair of gripping claws 52 from the state of FIG. 6B to the state of FIG. 6A, so that the unit nursery bed 71 is released from the holding member 5 and is completely inserted (transplanted) into the hole 41.

As the unit nursery bed 71 is released from the gripping claws 52, the holding member 5 is lifted by contraction of the rod 9 or the like, so that a plurality of holding members 5 move forward by a predetermined amount to the front face side (in the width direction of the frame 2) in preparation for the movement to the seedling tray 3 as described above, and the distance between the adjacent holding members 5 is reduced. Then, the holding member 5 is directly rotated by 90° and is recovered to the state facing the unit nursery bed 71 on the seedling tray 3 as illustrated in FIG. 2.

REFERENCE SIGNS LIST 1 transplanter
2 frame
21 horizontal frame
211 upper end horizontal frame
212 lower end horizontal frame
22 vertical frame
3 seedling tray
4 hydroponic panel
41 hole
5 holding member
51 main body
52 gripping claws
53 support member
531 vertical movement portion
532 pivotal support portion
533 holding portion
54 crank
55 connecting rod
56 motor
6 restraining member
61 sliding portion
62 restraining portion
7 nursery bed
71 unit nursery bed
8 arm
9 rod
10 guide bar
10a groove
11 control device

The invention claimed is:
1. A seedling transplanter comprising:
a seedling tray supported by a frame and configured to support a nursery bed having unit nursery beds individually planted with seedings, separable from each other, and arranged in two directions on a plane;
a hydroponic panel supported by the frame and provided with holes for storing the unit nursery beds, the hydroponic panel serving as a transplant destination of the unit nursery beds on the seedling tray; and
a holding member supported by the frame pivotally around a vertical axis and vertically movably while allowing advancing to the seeding tray side and receding from the seeding tray to separate the unit nursery bed on the seedling tray from the nursery bed, hold the unit nursery bed, insert the held unit nursery bed into the hole of the hydroponic panel, and release the unit nursery bed,
wherein the holding member holds any one or a plurality of unit nursery beds arranged in the outermost side of the nursery bed and provided with an opened lateral face not adjacent to the unit nursery bed from both sides of the width direction of the opened lateral face of the unit nursery bed facing the holding member and separates the unit nursery bed from the nursery bed to insert the unit nursery bed into the inside of the hole by directly lowering the unit nursery bed on the hole of the hydroponic panel,
the holding member has a main body supported by an arm pivotally supported by the frame around the vertical axis and a pair of gripping claws having tips openably/closably supported by the main body, the pair of gripping claws are inserted in an open state between the adjacent unit nursery beds in both sides of the width direction of the unit nursery bed from the opened lateral face side of the unit nursery bed and are directly closed to interpose and hold the unit nursery bed in the width direction when the holding member advances toward the seeding tray side, and the pair of gripping claws release the unit nursery bed by separating the held unit nursery bed from the nursery bed when the holding member recedes from the seeding tray.

2. The seedling transplanter according to claim 1, further comprising a restraining member configured to press a part of the unit nursery beds other than the unit nursery bed to be separated by the holding member from the nursery bed on the seedling tray from the lateral face side of the unit nursery bed to restrain the unit nursery beds in the unit nursery beds original positions when the unit nursery bed is separated using the holding member.

3. The seedling transplanter according to claim 2, wherein the restraining member is slidably supported by the frame in a direction crossing the direction of separating the unit nursery bed using the holding member and is moved to a position other than that of the unit nursery bed to be separated when the unit nursery bed is separated using the holding member.

4. The seedling transplanter according to claim 1, wherein a pair of support members that support the gripping claws are pivotally supported by the main body to be rotatable in a line symmetrical state to each other while the pair of support members are spaced apart from each other, the pair of gripping claws approach each other when the pair of support members are rotated in any direction, and the pair of gripping claws recede from each other when the pair of support members are recovered.

5. The seedling transplanter according to claim 1, wherein the holding member approaches the unit nursery bed from a front face side facing the holding member and holds the unit nursery bed from both sides of a direction perpendicular to the front face.

* * * * *